(12) United States Patent
Zhou

(10) Patent No.: US 9,071,539 B2
(45) Date of Patent: Jun. 30, 2015

(54) METHOD FOR AVOIDING A LOOP IN A NETWORK

(75) Inventor: Wan Zhou, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 0 days.

(21) Appl. No.: 14/116,311

(22) PCT Filed: Jul. 2, 2012

(86) PCT No.: PCT/CN2012/078029
§ 371 (c)(1),
(2), (4) Date: Feb. 10, 2014

(87) PCT Pub. No.: WO2013/004158
PCT Pub. Date: Jan. 10, 2013

(65) Prior Publication Data
US 2014/0204944 A1    Jul. 24, 2014

(30) Foreign Application Priority Data

Jul. 7, 2011 (CN) .......................... 2011 1 0190119

(51) Int. Cl.
*H04L 12/705* (2013.01)
*H04L 12/46* (2006.01)
*H04L 12/715* (2013.01)

(52) U.S. Cl.
CPC ............... *H04L 45/18* (2013.01); *H04L 45/04* (2013.01); *H04L 12/4633* (2013.01)

(58) Field of Classification Search
CPC ......... H04L 45/02; H04L 45/04; H04L 45/16; H04L 45/18; H04L 12/4633

USPC ......................................................... 370/392
See application file for complete search history.

(56) References Cited

U.S. PATENT DOCUMENTS

| 6,304,575 | B1 | 10/2001 | Carroll et al. | |
|---|---|---|---|---|
| 7,551,551 | B2 * | 6/2009 | Filsfils et al. | 370/219 |
| 7,961,600 | B2 * | 6/2011 | Filsfils et al. | 370/218 |
| 2004/0252634 | A1 * | 12/2004 | Regan et al. | 370/216 |

(Continued)

FOREIGN PATENT DOCUMENTS

| CN | 101765827 | 6/2010 |
|---|---|---|
| CN | 102340434 | 2/2012 |

(Continued)

OTHER PUBLICATIONS

CN First Office Action dated Aug. 19, 2013 issued on CN Patent Application No. 201110190119.6 dated Jul. 7, 2011, The State Intellectual Property Office, P.R. China.

(Continued)

*Primary Examiner* — Min Jung
(74) *Attorney, Agent, or Firm* — Mannava & Kang, P.C.

(57) ABSTRACT

According to an example, a method for avoiding a loop in a network, which is performed by each ED in each VPN site, comprises: interacting with other EDs in a same VPN site to elect a DED; assigning an authorized forwarding instance to each ED in the same VPN site when the ED is elected as the DED; obtaining the authorized forwarding instance from the DED when the ED is not elected as the DED; allowing traffic of the authorized forwarding instance transmitted from or to a public network, and blocking traffic of unauthorized forwarding instance transmitted from or to the public network.

13 Claims, 6 Drawing Sheets

(56) References Cited

U.S. PATENT DOCUMENTS

| | | | |
|---|---|---|---|
| 2006/0126496 A1* | 6/2006 | Filsfils et al. | 370/216 |
| 2006/0268869 A1* | 11/2006 | Boers et al. | 370/390 |
| 2012/0176934 A1* | 7/2012 | Farinacci et al. | 370/254 |
| 2012/0201124 A1* | 8/2012 | Marques et al. | 370/221 |
| 2012/0243442 A1* | 9/2012 | Musku et al. | 370/256 |
| 2013/0223283 A1* | 8/2013 | Kompella | 370/254 |

FOREIGN PATENT DOCUMENTS

| | | |
|---|---|---|
| EP | 1705840 | 9/2006 |
| WO | WO2007/144870 | 12/2007 |
| WO | WO2011/021180 | 2/2011 |

OTHER PUBLICATIONS

International Search Report and Written Opinion dated Oct. 25, 2012 issued on PCT Patent Application No. PCT/CN2012/078029 dated Jul. 2, 2012, The State Intellectual Property Office, the P.R. China.

K. Kompella, Ed., et al., "Virtual Private LAN Services (VPLS) Using BGP for Auto-Discovery and Signalling", RFC 4761, Jan. 2007, section 3.4, section 3.5.

M. Lasserre, Ed., et al., "Virtual Private LAN Service (VPLS) Using Label Distribution Protocol (LDP) Signalling", RFC4762, Jan. 2007, the whole document.

EP Extended European Search Report dated Feb. 3, 2015, EP Patent Application No. 12807852.4 dated Jul. 2, 2012, European Patent Office.

* cited by examiner

METHOD FOR AVOIDING A LOOP IN A NETWORK

CLAIM FOR PRIORITY

The present application is a national stage filing under 35 U.S.C 371 of PCT application number PCT/CN2012/078029, having an international filing date of Jul. 2, 2012, which claims priority to Chinese patent application 201110190119.6, filed on Jul. 7, 2011, the disclosures of which are hereby incorporated by reference in its entirety.

BACKGROUND

Currently, in order to ensure high reliability and to implement load sharing, a site usually accesses a network of an operator via multi-homing. FIG. 1 is a schematic diagram illustrating a site accessing a network of an operator via multi-homing. In FIG. 1, two sites, site 1 and site 2, respectively access the network of the operator via Edge Devices (EDs) of their own to implement interaction.

P2P (Point to Point) channels are established between the edge devices located between the sites to enable communications between the sites. The P2P channel can support Virtual Private Lan Service (VPLS), Generic Routing Encapsulation (GRE), Transparent Interconnection of Lots of Links (TRILL), and Media Access Control In Media Access Control (MacInMac), etc. As shown in FIG. 1, the P2P channels are established between ED1 and ED2 of site 1, and ED3 and ED4 of site 2.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. In the present disclosure, the term "includes" means includes but not limited thereto, the term "including" means including but not limited thereto. The term "based on" means based at least in part on. In addition, the terms "a" and "an" are intended to denote at least one of a particular element.

Figure 1:
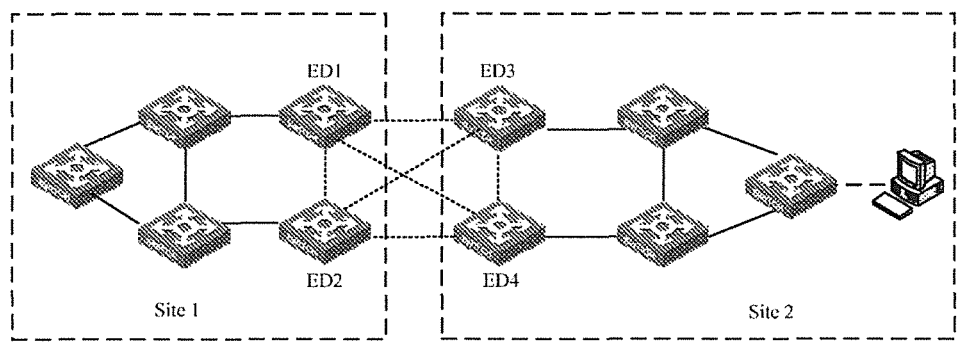
FIG. 1 is a schematic diagram illustrating a site accessing a network of an operator via multi-homing.
Figure 2:
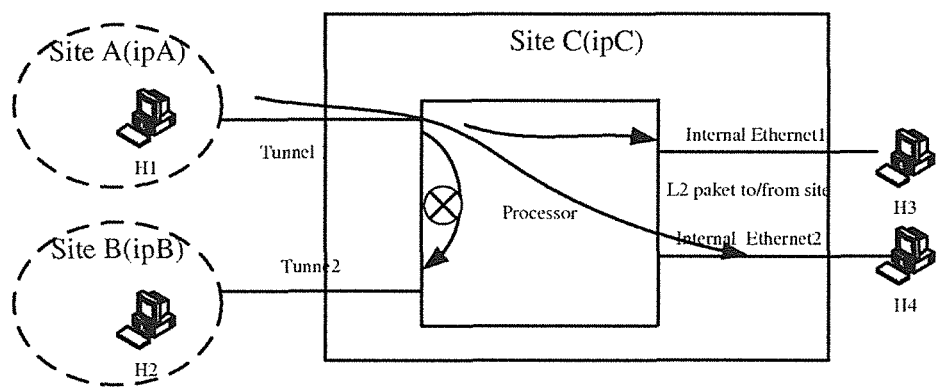
FIG. 2 is a schematic diagram illustrating that an ED enables split horizon technologies.
Figure 3:
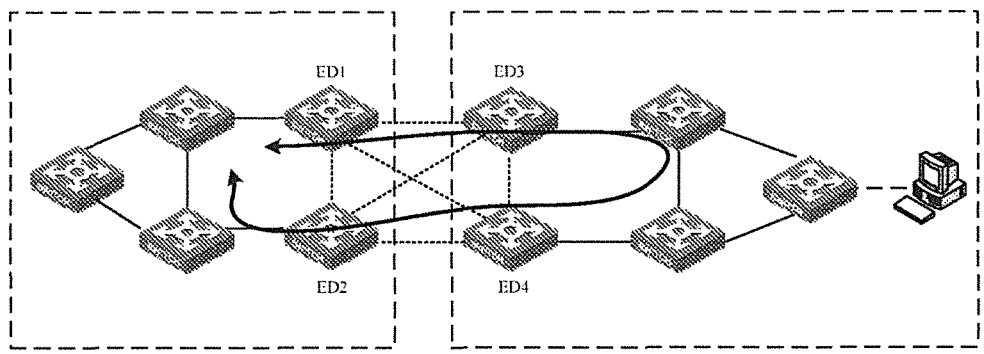
FIG. 3 is a schematic diagram illustrating a loop possibly formed between two-layer networks of sites located in different areas.

In conventional networks having multiple sites, in order to avoid a loop, split horizon technologies are enabled by the EDs in the sites, as shown in FIG. 2, packets received from site A by the ED of site C will not be forwarded to site B. However, the split horizon technologies are only applicable when the site accesses the network via one ED. When the site accesses the network via multi-homing, even if the split horizon technologies are enabled by the EDs of the sites, a big loop will be formed between two-layer networks of sites located in different areas, as a loop shown in FIG. 3 (shown by a thick line), which will cause a broadcast storm.

Figure 4:
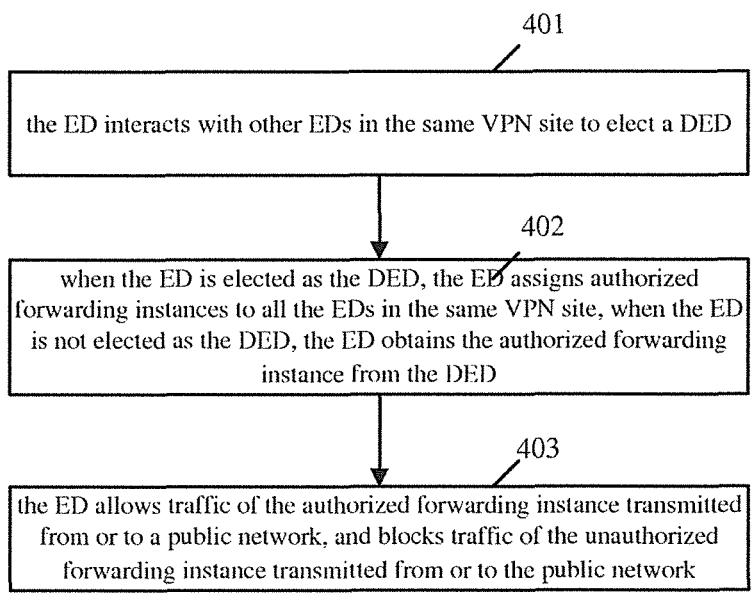
FIG. 4 is a flowchart illustrating a basic procedure in accordance with an example of the present disclosure.

Turning now to FIG. 4 there is shown a flowchart illustrating a basic procedure in accordance with an example of the present disclosure. The method is applied when more than two VPN (Virtual Private Network) sites are included in a network. Each of the VPN sites aims at a user side and includes at least two EDs. Each of the EDs in the VPN sites is used to forward traffic of a forwarding instance to a public network and decapsulate the traffic of the forwarding instance from the public network to the VPN site. In order to avoid a loop, in an example of the present disclosure, each ED is assigned to an authorized forwarding instance, and each ED only forwards the traffic of the authorized forwarding instance to the public network and decapsulates the traffic of the forwarding instance from the public network to the VPN site.

As shown in FIG. 4, each ED in each VPN site performs the following operations.

In block 401, each ED interacts with other EDs in the same VPN site to elect a Designated Edge Device (DED).

In block 402, when the ED is elected as the DED, the ED assigns authorized forwarding instances to all the EDs in the same VPN site, and when the ED is not elected as the DED, the ED obtains the authorized forwarding instance from the DED.

In block 403, the ED allows traffic of the authorized forwarding instance transmitted from or to a public network, and blocks traffic of unauthorized forwarding instances transmitted from or to the public network.

Specifically, the traffic of the forwarding instance transmitted from or to the public network includes: the traffic of the forwarding instance transmitted to the public network from the site and the traffic of the forwarding instance transmitted to the site from the public network.

As can be seen, according to the method shown in FIG. 4, the DED is elected from all the EDs in the same site, and the DED assigns the authorized forwarding instance for each ED in the same site. Each ED allows the traffic of the authorized forwarding instance transmitted from or to the public network, and blocks the traffic of unauthorized forwarding instances transmitted from or to the public network, so that the traffic of each forwarding instance transmitted from or to the public network gathers at the same ED. In other words, based on the procedure shown in FIG. 4, all of the traffic of each forwarding instance is transmitted from or to the public network via the same ED without being forwarded to other forwarding instances, thereby mitigating a two-layer loop from possibly occurring when two VPN sites located in different areas interact with each other. In addition, when a forwarding failure of the traffic of the forwarding instance occurs, because the traffic of the forwarding instance gathers at the same ED, the forwarding failure is limited in the single VPN site without affecting other VPN sites.

In the following, the VPN site is called "the site" to facilitate description.

In addition, in the above descriptions, the forwarding instance may be a Virtual Local Area Network (VLAN), and the method of the present disclosure shown in FIG. 4 will be described in detail.

Before describing an example procedure of the present disclosure, VLANs maintained by the ED are divided into LCV (Local Configured VLANs), LEV (Local Extended VLANs), LAV (Local Authorized VLANs), LPV (Local Prepared VLANs), RPV (Remote Prepared VLANs), and LFV (Local Forwarding VLANs).

The LCV is carried by the ED, which is globally unique, and is used to help the ED in determining the VLAN used when negotiating with a site located in a different area.

Usually, some VLANs are extended for the ED besides the LCV carried by the ED to meet application needs, the extended VLAN is configured on the ED in a list mode and recorded as the LEV. The LEV is used to interact with the ED in the site located in the different area. In addition, assigning the authorized forwarding instance to the ED mentioned in the present disclosure is assigning the authorized LEV to the ED;

When the LEV is assigned to the ED as the authorized forwarding instance, the LEV is called "the LAV" of the ED, in which the LAV is a subset of the LEV configured for the ED, is the LEV in a control plane, and is globally unique.

The LPV is the VLAN prepared by the ED and needed to negotiate with an opposite side, which is an ED in a site located in a different area, which is globally unique, and is a result of an and operation of the LAV and LCV, which is expressed as and (LAV, LCV). The opposite side may be notified of the LPV via a P2P ISIS Hello message.

The RPV is the VLAN prepared by the opposite side to negotiate with the ED and the ED may be notified of the LPV via the P2P ISIS Hello message.

The LFV is the VLAN in the data plane, is used to conduct packet forwarding in the data plane, and is a result of an and operation of the LVP and RPV, which is expressed as and (LVP, RPV).

Figure 5:
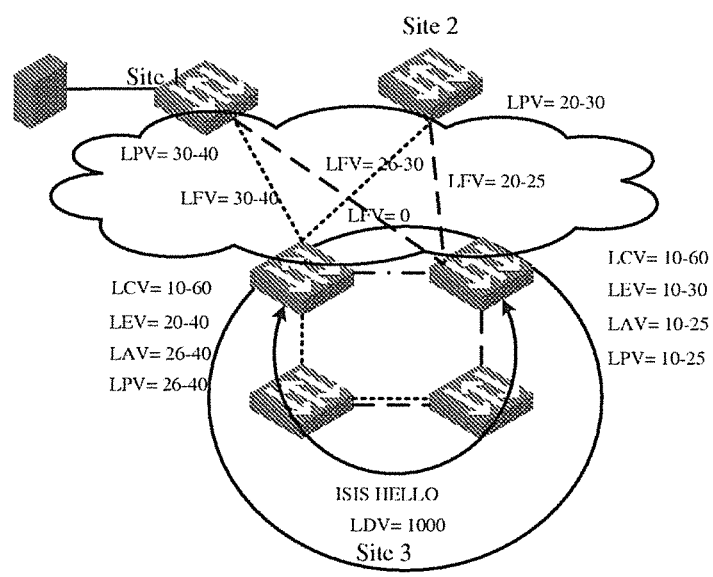
FIG. 5 is a schematic diagram illustrating VLANs on each edge device in each site in accordance with an example of the present disclosure.

For understanding the above VLANs conveniently, FIG. 5 shows the VLANs on each edge device in each site.

The procedure of the present disclosure will be described in detail via FIG. 6 based on FIG. 5.

Figure 6:
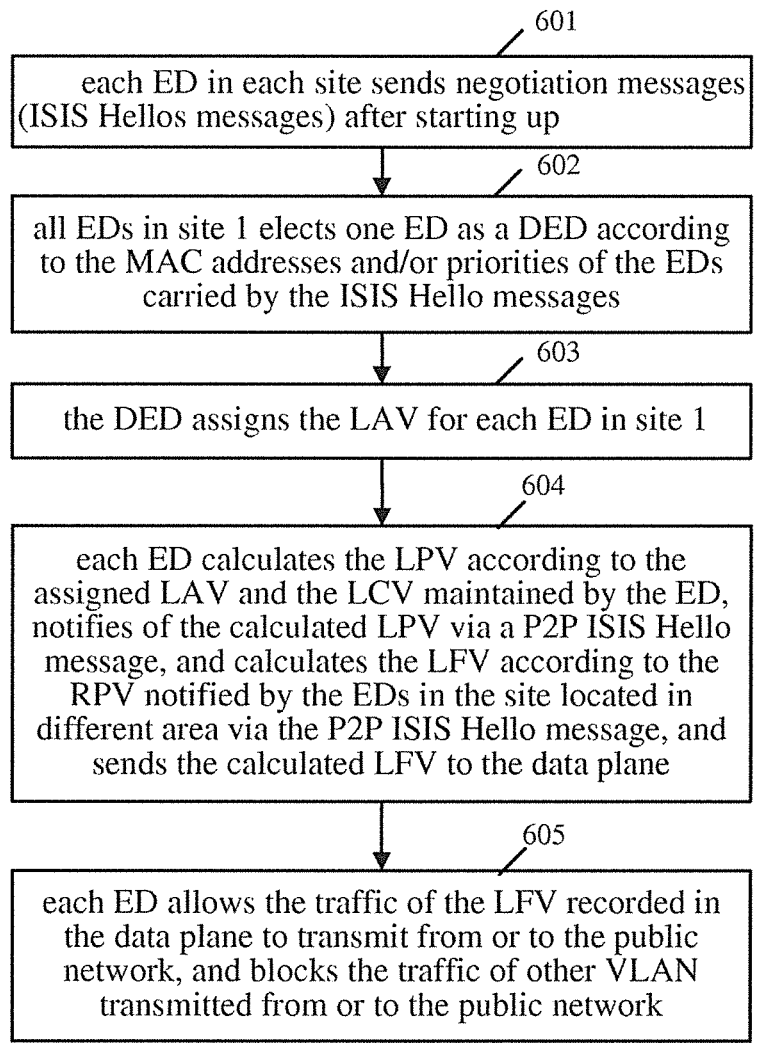
FIG. 6 is a flowchart illustrating a particular procedure in accordance with an example of the present disclosure.

FIG. 6 is a flowchart illustrating a particular procedure in accordance with an example of the present disclosure. As shown in FIG. 6, the procedure includes the following operations.

In block 601, each ED in each site sends negotiation messages to other EDs in the same site after starting up. Site 1 is taken as an example.

In block 601, the negotiation message may be an ISIS Hello message carrying a MAC address and/or priority of the ED sending the negotiation message.

When applying the example, the ED may use other messages carrying the MAC address and/or priority of the ED, which do not affect the implementation of the example.

In block 602, all of the EDs in site 1 elect one ED as a DED according to the MAC addresses and/or priorities of the EDs carried by the ISIS Hello messages.

After starting up, each ED determines that the ED is not the DED acquiescently, and election needs to be performed to determine the DED.

In block 602, the election of the DED may be performed according to the MAC addresses and priorities of the EDs carried in the negotiation messages. The negotiation message sent by each ED includes the MAC address and priority of the ED. Specifically, the ED with the highest priority, lowest priority or a certain priority is selected from all EDs in site 1 according to the priorities of the EDs carried in the received negotiation messages. If multiple EDs are selected, the ED with the largest or smallest MAC address is selected from the multiple selected EDs, and the ED finally selected is determined as the DED.

In block 602, the election of the DED may be performed according to the MAC addresses or priorities of the EDs carried in the negotiation messages. Electing the DED according to the priorities of the EDs is taken as example, and the negotiation message sent by each ED includes the priority of the ED. The principle of electing the DED according to the MAC addresses of the EDs is similar. When the DED is elected according to the priorities of the EDs, the ED with the highest priority, lowest priority or a certain priority is selected from all of the EDs in site 1 according to the priorities of the EDs carried in the received negotiation messages. If multiple EDs are selected, one of the multiple EDs may be determined as the DED. If only one ED is selected, the selected ED is determined as the DED.

In block 603, the DED assigns the LAV for each ED in site 1.

Specifically, in block 603, after the DED is determined, each ED in site 1 reports the LEV configured in the ED to the DED and the DED determines whether the LEV is only configured in the ED reporting the LEV according to all the received LEVs configured in the EDs. If the LEV is only configured in the ED reporting the LEV, the DED assigns the LEV to the ED reporting the LEV as the LAV. If the LEV is also configured in other EDs, the ED to be assigned with the LEV may be determined according to the following operations.

In block 1, the EDs configured with the LEV are numbered from an initial value, e.g., numbered from 0.

In block 2, an identity of the LEV is divided by the number of EDs configured with the LEV, and a residual value is obtained. Calculation is performed according to the following formula:

$$f(\text{VLAN ID})=(\text{VLAN ID})\% \text{ Number of ED};$$

wherein, VLAN ID is the identity of the LEV, the value range is from 1 to 4094; Number of ED is the number of EDs configured with the LEV, % indicates the operation of obtaining the residual value; and f (VLAN ID) is the obtained residual value.

In block 3, an ED is selected from the EDs configured with the LEV, and the number of the selected ED corresponds to the residual value.

For example, in block 1, the EDs configured with the LEV are numbered from 0, in block 2, the obtained residual value is 1, and in block 3, the LEV is assigned to the ED whose number is 1.

As can be seen, based on the above blocks 1 to 3, when the same LEV is configured in multiple EDs, the LEV is assigned to one of the EDs as the LAV.

In addition, in the examples of the present disclosure, other modes may be adopted to determine the ED to be assigned with the LEV. For example, a priority of the LEV in the ED is carried in the negotiation message sent by the ED, and the DED may assign the LEV to the ED corresponding to the highest priority.

Figure 7:
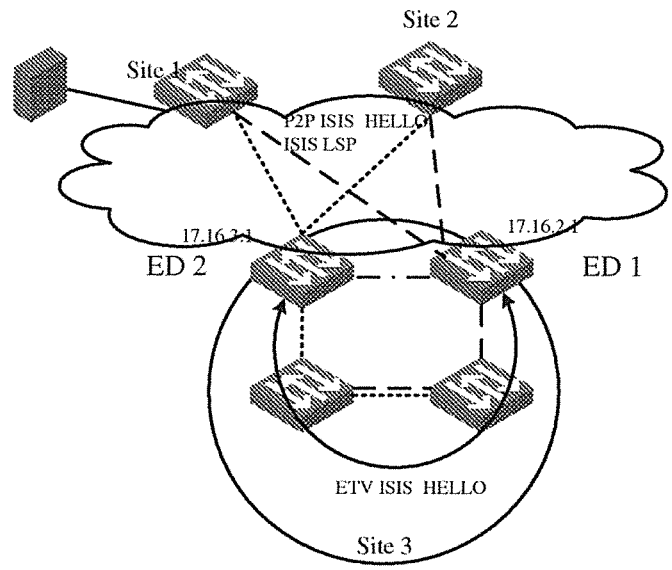
FIG. 7 is a schematic diagram illustrating assignment of an authorized VLAN for an edge device in accordance with an example of the present disclosure.

In the case of typical multi-homing, the LEV may be assigned to the ED as the LAV according to the parity of the identity of the LEV, which is particularly shown in FIG. 7. Site 3 in FIG. 7 is taken as an example. The traffic of the LEV with odd identity is transmitted from or to the public network via ED 1 in site 3 (indicated by - - - ), the traffic of the LEV with even identity is transmitted from or to the public network via ED 2 in site 3 (indicated by --------), no VLAN passes the link between ED1 and ED2, and no traffic is carried (indicated by -•- ).

In this way, after block 603, the DED assigns the LAV for each ED in the same site. The ED assigned with the LAV is called an "Appointed Edge Forwarder" (AEF) of the LAV. The AEF performs the following functions:

1. controlling whether to allow the traffic of the assigned LAV to transmit from or to the public network, which carries tunnel traffic of the LAV;

2. learning the MAC address of the LAV from a decapsulated tunnel message, intercepting Internet Group Management Protocol (IGMP), Multicast Listener Discover (MLD), Multicast Route Discover (MRD) packets learning broadcast members and router information on a virtual Ethernet link of the LAV, etc.

In block 604, each ED calculates the LPV according to the assigned LAV and the LCV maintained by the ED, notifies the EDs in the site located in a different area of the calculated LPV via a P2P ISIS Hello message, and calculates the LFV according to the RPV notified by the EDs in the site located in the different area via the P2P ISIS Hello message, and sends the calculated LFV to the data plane.

In block 604, the LPV may be calculated according to the formula 1:

LPV=and (LAV,LCV);    (formula 1)

In block 604, the LFV may be calculated according to the formula 2:

LFV=and (LPV,RPV).    (formula 2)

In block 605, each ED controls the traffic according to the LFV recorded in the data plane, allows the traffic of the LFV recorded in the data plane to transmit from or to the public network, and blocks the traffic of other VLANs transmitted from or to the public network.

Thus, the procedure shown in FIG. 6 is completed.

Usually, the LAV of the ED is not fixed, and will change along with network topology, service requirements, etc. When the LAV of the ED changes, the ED recalculates a LPV according to the changed LAV based on the formula 1, and notifies the EDs in the site located in a different area of the recalculated LPV (for the opposite side, the notified LPV is called as RPV) via the P2P ISIS Hello message, recalculates the LFV according to the RPV notified by the opposite sides and the calculated LPV based on the formula 2, and updates the LFV in the data plane by using the recalculated LFV.

The process of updating the LFV in the data plane by using the recalculated LFV includes: if the LFV in the data plane is added, allowing the traffic of the added LFV transmitted from or to the public network, adding the MAC address of the added LFV into the data plane, and notifying the EDs in the site located in different area of the MAC route corresponding to the added LFV. If the LFV in the data plane is decreased, blocking the traffic of the decreased LFV transmitted from or to the public network, cancelling the MAC address of the decreased LFV from the data plane, and notifying the EDs in the site located in the different area to cancel the MAC route corresponding to the decreased LFV. Preferably, the MAC route may be notified via the ISIS LSP.

In an example of the present disclosure, all of the EDs in each site periodically sends the negotiation messages, e.g., the ISIS Hello messages, to ensure stable neighbor relations. The negotiation message carries the MAC address and/or priority of the ED sending the negotiation message. When the ED, except the DED, in the same site does not receive the ISIS Hello message from the DED for a preset time period T0, the traffic transmitted from or to the public network of all the VLANs is blocked for a preset time period T1. During the time period T1, the EDs reelect a new DED according to the MAC addresses and/or priorities of the EDs carried by the ISIS Hello messages received from other EDs, the new DED assigns the LAV for each ED in the same site. The ED previously elected as the DED is not regarded as the DED. For each ED, if the LAV assigned by the new DED is different from the previously assigned LAV, the ED updates the LFV in the data plane according to the changed LAV. The procedure of updating the LFV according to the changed LAV has been described above, and will not be described herein.

In an example of the present disclosure, the T1 may be configured according to experiences, e.g., 2-3 seconds, so as to ensure that the operations of reelecting the new DED and assigning the LAV for each ED in the same site by the new DED can be implemented in the T1 time period.

In addition, in the multi-homing system, one site may split into at least two sites, and each split site will include the LAV with a changed Spanning Tree Protocol (STP) topology. In addition, if the split site is not in the same site with the DED, the split site will not receive the ISIS Hello messages sent by the DED and other EDs.

In an example of the present disclosure, each ED in the split site blocks the traffic of the LAV with changed STP topology transmitted from or to the public network for a preset time period T2, the T2 may be set according to practical conditions or experiences, e.g., 30s, if the ISIS Hello message from the DED is not received in T0, the traffic of all the VLANs transmitted from or to the public network is blocked for the time period T1. When the site splitting does not occur, the LAV with changed STP topology may be included in the site, but the EDs in the site can still receive the ISIS Hello message from the DED. By using the above operation, whether the splitting occurs is determined. In the time period T1, the EDs in the split site reelect a new DED, which includes: if only one ED is included in the site, the ED is reelected as the new DED, the new DED assigns LAV for each ED in the same site. If at least two EDs are included in the site, a new DED is reelected, and the new DED assigns LAV for each ED in the same site, which may refer to the example shown in FIG. 6 and will not be described herein. In the examples of the present disclosure, the sum of T1 and T0 is less than T2.

Figure 8:
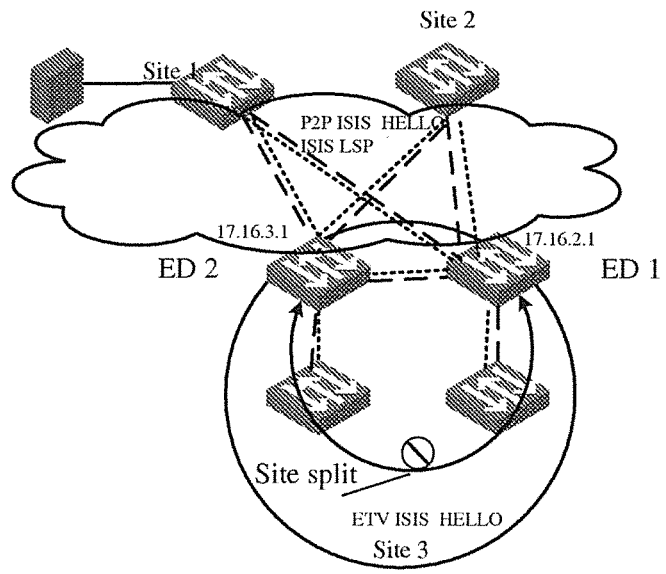
FIG. 8 is a schematic diagram illustrating assignment of an authorized VLAN for an edge device after the site is split in accordance with an example of the present disclosure.

Site 3 shown in FIG. 7 is taken as an example. As shown in FIG. 7, site 3 is split into two sites, which are site 4 and site 5, respectively, and ED 1 is in site 4 and ED2 is in site 5. According to the above description, if site 4 includes only ED1 and site 5 includes only ED2, ED1 and ED2 will become the DEDs of site 4 and site 5 respectively. In this way, all virtual links from ED1 and ED2 to the public network side carry VLAN, which are indicated by the thick line between ED1 and ED2 shown in FIG. 7, FIG. 8 shows the situation in detail.

In an example of the present disclosure, when at least two sites fuse into one new site, each ED in the new site recognizes the EDs in the same site, and blocks the traffic transmitted from or to the public network of the conflicting VLAN for a preset time period T3, the T3 may be set according to practical conditions or experiences, e.g., 30s. The conflicting VLAN refers to the VLAN used by at least two EDs in the new site to conduct packet forwarding. Then a new DED is reelected according to the MAC addresses and priorities of the EDs carried by the received negotiation messages, i.e., ISIS Hello messages, the new DED assigns the LAV for each ED in the same site.

The processing of the ED recognizing the EDs in the same site includes: recognizing the EDs in the same site according to the negotiation messages, i.e., the ISIS Hello messages sent by other EDs. Usually, the negotiation message, i.e., the ISIS Hello message is sent only between the EDs in the same site, and the P2P ISIS Hello message is sent between the EDs in different sites. Therefore, when receiving the ISIS Hello message from another ED, the ED determines that the ED itself and the ED sending the ISIS Hello message are in the same site. When receiving the P2P ISIS Hello message from another ED, the ED determines that the ED itself and the ED sending the P2P ISIS Hello message are in different sites.

The apparatus provided by the examples of the present disclosure will be described as follows.

Figure 9:
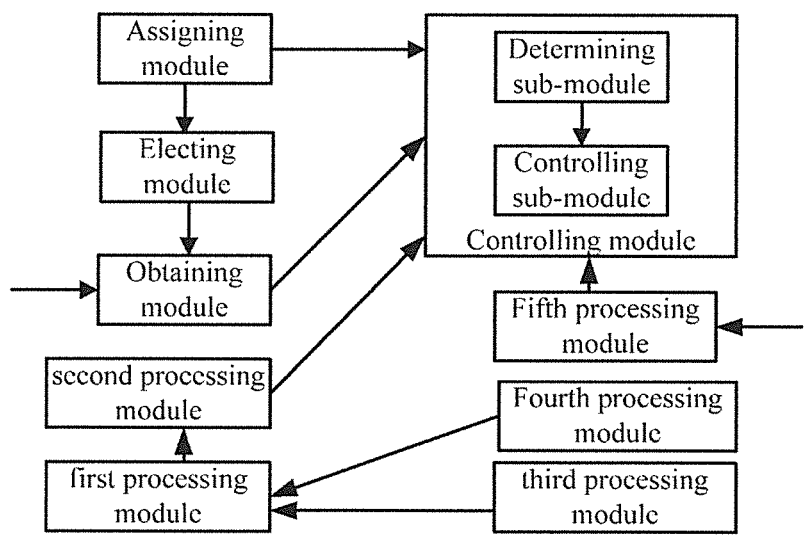
FIG. 9 is a schematic diagram illustrating an apparatus in accordance with an example of the present disclosure.

FIG. 9 is a schematic diagram illustrating an apparatus in accordance with an example of the present disclosure. The apparatus may be applied in an ED of a site. As shown in FIG. 9, the apparatus includes:

an electing module to interact with other EDs in the same VPN site to elect a DED, the electing module sends a message carrying a MAC address and/or priority of the ED to other EDs after the ED starts up, and elects the DED according to the MAC address and/or priority of the ED and the messages sent by other EDs in the same VPN site;

an assigning module to assign authorized forwarding instances to all the EDs in the same VPN site when the DED elected by the electing module is the ED; in an example of the present disclosure, the assigning module assigns the authorized forwarding instance to all the EDs in the same VPN site as following: for each forwarding instance configured in each ED of the same VPN site, if the forwarding instance is configured only in one ED, the forwarding instance is assigned as the authorized forwarding instance to the ED, if the forwarding instance is configured in at least two EDs, one of the EDs is determined, e.g., according to an identity of the forwarding instance and the number of the EDs configured with forwarding instance, and the forwarding instance is assigned as the authorized forwarding instance to the determined ED;

an obtaining module to obtain an authorized forwarding instance from the elected DED when the DED elected by the electing module is not the ED;

a controlling module to allow traffic of the authorized forwarding instance transmitted from or to a public network, and block traffic of unauthorized forwarding instance transmitted from or to the public network.

According to an example, as shown in FIG. 9, the ED further includes:

a first processing module to periodically send a message carrying a MAC address and/or priority of the ED, e.g., an ISIS Hello message, block traffic transmitted from or to the public network of all forwarding instances for a preset time period T1 when the message is not received from the DED for a preset time period T0, and reelect a new DED according to the MAC addresses and/or priorities of the EDs carried by the messages received from other EDs in the preset time period T1;

a second processing module to assign an authorized forwarding instance for each ED in the same site when the ED is reelected as the DED; obtain an authorized forwarding instance from the reelected DED when the ED is not reelected as the DED; update the authorized forwarding instance changed when the authorized forwarding instance changes;

a third processing module to, when the VPN site of the ED splits into at least two sites, block traffic of the forwarding instance with changed STP topology transmitted from or to the public network for a preset time period T2, block traffic of all the forwarding instances transmitted from or to the public network for the time period T1 if the message from the DED is not received in the time period T0. In the time period T1, the EDs in the split site reelect a new DED, and the reelected DED assigns the authorized forwarding instance for each ED in the same site, and the sum of T1 and T0 is less than T2;

a fourth processing module to, when the VPN site of the ED and another VPN site fuse into one new site, recognize EDs in the new site, block traffic transmitted from or to the public network of a conflicting forwarding instance for a preset time period T3; reelect a new DED according to the MAC addresses and/or priorities of the EDs carried by the received messages, the new DED assigns the authorized forwarding instance for each ED in the same site; the forwarding instance is determined as the conflicting forwarding instance when the forwarding instance is assigned as the authorized forwarding instance to at least two EDs in the new VPN site.

Preferably, as shown in FIG. 9, the controlling module includes:

a determining sub-module to determine a forwarding instance used to conduct packet forwarding in a data plane according to the authorized forwarding instance assigned to the ED;

a controlling sub-module to allow traffic of the forwarding instance determined by the determining sub-module transmitted from or to the public network and block traffic of other forwarding instance transmitted from or to the public network.

Accordingly, in an example, the second processing module, when updating the changed authorized forwarding instance, is further to re-determine the forwarding instance used to conduct the packet forwarding in the data plane according to the changed authorized forwarding instance, and update the forwarding instance used to conduct the packet forwarding in the data plane by using the re-determined forwarding instance.

When the second processing module re-determines the forwarding instance used to conduct the packet forwarding in the data plane according to the changed authorized forwarding instance, the second processing module is further to determine a forwarding instance used to negotiate with the ED in the site located in different area according to the changed authorized forwarding instance, notify the ED in the site located in the different area of the determined forwarding instance used to negotiate with the ED in the site located in the different area, so that the ED in the site located in the different area can update the forwarding instance used to conduct the packet forwarding in the data plane according to the notified forwarding instance and determine the forwarding instance used to conduct the packet forwarding in the data plane according to the determined forwarding instance.

According to an example, the ED further includes:

a fifth processing module to receive the forwarding instance notified by the ED in the site located in different area to negotiate with the ED in the site located in different area, re-determine the forwarding instance used to conduct the packet forwarding in the data plane according to the notified forwarding instance, and update the forwarding instance used to conduct the packet forwarding in the data plane by the re-determined forwarding instance.

When the second processing module or the fifth processing module updates the forwarding instance used to conduct the packet forwarding in the data plane by the re-determined forwarding instance, the second processing module or the fifth processing module is to compare the re-determined forwarding instance and the determined forwarding instance used to conduct the packet forwarding in the data plane, if the forwarding instance increases, add a MAC address corresponding to the increased forwarding instance in the data plane, and notify the EDs in the site located in different areas of a MAC route corresponding to the increased forwarding instance, if the forwarding instance decreases, cancel a MAC address corresponding to the decreased forwarding instance in the data plane, and notify the EDs in the site located in different areas of a MAC route corresponding to the decreased forwarding instance.

As can be seen, in the examples of the present disclosure, the DED is elected from all the EDs in the same site, and the DED assigns the authorized forwarding instance for each ED in the same site; each ED allows the traffic of the authorized forwarding instance transmitted from or to the public network, and blocks the traffic of the unauthorized forwarding instance transmitted from or to the public network, so that the traffic of each forwarding instance transmitted from or to the public network gathers at the same ED without forwarded to other forwarding instance, thereby mitigating a two-layer loop possibly occurs when two VPN sites located in different areas interact with each other. In addition, when a forwarding failure of the traffic of the forwarding instance occurs, because the traffic of the forwarding instance gathers at the same ED, the forwarding failure is limited in the single VPN site without affecting other VPN sites.

The above examples can be implemented by hardware, software or firmware or a combination thereof. For example the various methods, processes and functional modules described herein may be implemented by a processor (the term processor is to be interpreted broadly to include a CPU, processing unit, ASIC, logic unit, or programmable gate array etc.). The processes, methods and functional modules may all be performed by a single processor or split between several processors; reference in this disclosure or the claims to a 'processor' should thus be interpreted to mean 'one or more processors'. The processes, methods and functional modules be implemented as machine readable instructions executable by one or more processors, hardware logic circuitry of the one or more processors or a combination thereof. Further the teachings herein may be implemented in the form of a software product. The computer software product is stored in a storage medium and comprises a plurality of instructions for making a computer device (which can be a personal computer, a server or a network device such as a router, switch, access point etc.) implement the method recited in the examples of the present disclosure.

The modules in the device in the example can be arranged in the device in the examples as described, or can be alternatively located in one or more devices different from that in the examples. The modules in the aforesaid examples can be combined into one module or further divided into a plurality of sub-modules.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A method for avoiding a loop in a network having more than two Virtual Private Network (VPN) sites, wherein each VPN site comprises at least two Edge Devices (EDs), the method being performed by an ED and comprising:
    interacting with other EDs in a same VPN site to elect a Designated Edge Device (DED);
    assigning an authorized forwarding instance to each ED in the same VPN site when the ED is elected as the DED, wherein assigning the authorized forwarding instance further comprises:
        for each forwarding instance configured in each ED of the same VPN site, if the forwarding instance is configured only in one ED, assigning the forwarding instance as the authorized forwarding instance to the one ED; and
        if the forwarding instance is configured in at least two EDs, determining one of the at least two EDs according to an identity of the forwarding instance and the number of the EDs configured with the forwarding instance, and assigning the forwarding instance as the authorized forwarding instance to the determined ED;
    obtaining the authorized forwarding instance from the DED when the ED is not elected as the DED; and
    allowing traffic of the authorized forwarding instance transmitted from or to a public network, and blocking traffic of unauthorized forwarding instance transmitted from or to the public network.

2. The method of claim 1, wherein interacting with other EDs in a same VPN site to elect a DED further comprises:
    sending a message carrying a MAC address and/or priority of the ED to other EDs in the same VPN site after the ED starts up; and
    electing the DED according to the MAC address and/or priority of the ED and messages sent by other EDs.

3. The method of claim 1, wherein determining one of the at least two EDs according to an identity of the forwarding instance and the number of the EDs configured with the forwarding instance comprises:
    numbering the EDs configured with the forwarding instance from an initial value;
    dividing the identity of the forwarding instance by the number of EDs configured with the forwarding instance, and obtaining a residual value; and
    selecting an ED from the EDs configured with the LEV, the number of the selected ED corresponding to the residual value.

4. The method of claim 1, further comprising:
    periodically sending a message carrying a MAC address and/or priority of the ED;
    when the VPN site of the ED splits into at least two VPN sites,
    blocking traffic of a forwarding instance with a changed spanning Tree Protocol (STP) topology that is transmitted from or to the public network for a preset time period T2;
    blocking traffic of all forwarding instances transmitted from or to the public network for a preset time period T1 if the message from the DED is not received in a preset time period T0;
    reelecting a new DED according to the MAC address and/or priority of the ED and the messages sent by other EDs;
    assigning an authorized forwarding instance for each ED in the same VPN site when the ED is reelected as the DED;
    obtaining the authorized forwarding instance from the reelected DED; and
    updating the authorized forwarding instance when the authorized forwarding instance changes;
    wherein a sum of T1 and T0 is less than T2.

5. The method of claim 1, further comprising:
periodically sending a message carrying a MAC address and/or priority of the ED;
when the VPN site of the ED and another VPN site fuse into one new VPN site,
recognizing EDs in the new VPN site;
blocking traffic transmitted from or to the public network of a conflict forwarding instance for a preset time period T3;
reelecting a new DED according to the MAC address and/or priority of the ED and the messages sent by other EDs;
assigning an authorized forwarding instance for each ED in the same VPN site when the ED is reelected as the DED;
obtaining the authorized forwarding instance from the reelected DED; and
updating the authorized forwarding instance when the authorized forwarding instance changes;
wherein the conflict forwarding instance is a forwarding instance assigned to at least two EDs as the authorized forwarding instance in the new VPN site.

6. A method for avoiding a loop in a network having more than two Virtual Private Network (VPN) sites, wherein each VPN site comprises at least two Edge Devices (EDs), the method being performed by an ED and comprising:
interacting with other EDs in a same VPN site to elect a Designated Edge Device (DED);
assigning an authorized forwarding instance to each ED in the same VPN site when the ED is elected as the DED;
obtaining the authorized forwarding instance from the DED when the ED is not elected as the DED;
allowing traffic of the authorized forwarding instance transmitted from or to a public network, and blocking traffic of unauthorized forwarding instance transmitted from or to the public network;
periodically sending a message carrying a MAC address and/or priority of the ED;
blocking traffic transmitted from or to the public network of all forwarding instances for a preset time period T1 when the message is not received from the DED for a preset time period T0;
reelecting a new DED according to the MAC addresses and/or priorities of the EDs carried by the messages received from other EDs in the preset time period T1;
assigning an authorized forwarding instance for each ED in the same VPN site when the ED is reelected as the DED;
obtaining the authorized forwarding instance from the reelected DED; and
updating the authorized forwarding instance when the authorized forwarding instance changes.

7. The method of claim 6, wherein allowing traffic of the authorized forwarding instance transmitted from or to a public network, and blocking traffic of unauthorized forwarding instance transmitted from or to the public network comprises:
determining a forwarding instance used to conduct packet forwarding in a data plane according to the authorized forwarding instance assigned to the ED; and
allowing traffic of the forwarding instance used to conduct packet forwarding in the data plane transmitted from or to the public network and blocking traffic of other forwarding instances transmitted from or to the public network.

8. An edge device comprising:
an electing module to interact with other EDs in a same VPN site to elect a DED;
an assigning module to assign an authorized forwarding instance to each ED in the same VPN site when the ED is elected as the DED, wherein the assigning module is to, for each forwarding instance configured in each ED of the same VPN site, if the forwarding instance is configured only in one ED, assign the forwarding instance as the authorized forwarding instance to the one ED; if the forwarding instance is configured in at least two EDs, determine one of the at least two EDs according to an identity of the forwarding instance and the number of the EDs configured with the forwarding instance, and assign the forwarding instance as the authorized forwarding instance to the determined ED;
an obtaining module to obtain the authorized forwarding instance from the DED when the ED is not elected as the DED; and
a controlling module to allow traffic of the authorized forwarding instance transmitted from or to a public network, and block traffic of an unauthorized forwarding instance transmitted from or to the public network; and
a processor to execute said electing module, said assigning module, said obtaining module, and said controlling module.

9. The edge device of claim 8, wherein
the electing module is to send a message carrying a MAC address and/or priority of the ED to other EDs after the ED starts up, and elect the DED according to the MAC address and/or priority of the ED and the messages sent by other EDs.

10. The edge device of claim 8, further comprising:
a first processing module to periodically send a message carrying a MAC address and/or priority of the ED, block traffic transmitted from or to the public network of all forwarding instances for a preset time period T1 when the message is not received from the DED for a preset time period T0, and reelect a new DED according to the MAC addresses and/or priorities of the EDs carried by the messages received from other EDs in the preset time period T1; and
a second processing module to assign an authorized forwarding instance for each ED in the same VPN site when the ED is reelected as the DED; obtain the authorized forwarding instance from the reelected DED when the ED is not reelected as the DED, and update the authorized forwarding instance when the authorized forwarding instance changes.

11. The edge device of claim 10, further comprising
a third processing module to, when the VPN site of the ED splits into at least two VPN sites, block traffic of forwarding instance with changed STP topology transmit from or to the public network for a preset time period T2, block traffic of all forwarding instances transmitted from or to the public network for a preset time period T1 if the message from the DED is not received in a time period T0; reelect a new DED in the EDs in the split VPN site, wherein a sum of T1 and T0 is less than T2.

12. The edge device of claim 10, further comprising:
a fourth processing module to, when the VPN site of the ED and another VPN site fuse into one new VPN site, recognize EDs in the new VPN site, block traffic transmitted from or to the public network of a conflict forwarding instance for a preset time period T3; reelect a new DED according to the MAC addresses and/or priorities of the EDs carried by the received messages,
wherein the conflict forwarding instance is a forwarding instance assigned to at least two EDs as the authorized forwarding instance in the new VPN site.

13. The edge device of claim 10, wherein the controlling module comprises:
- a determining sub-module to determine a forwarding instance used to conduct packet forwarding in a data plane according to the authorized forwarding instance assigned to the ED; and
- a controlling sub-module to allow traffic of the forwarding instance determined by the determining sub-module transmitted from or to the public network and block traffic of other forwarding instances transmitted from or to the public network.

\* \* \* \* \*